Patented Nov. 3, 1927.

1,648,207

UNITED STATES PATENT OFFICE.

ARTHUR VON WEINBERG, OF FRANKFORT-ON-THE-MAIN, AND WERNER SCHMIDT, OF FECHENHEIM, NEAR FRANKFORT-ON-THE-MAIN, GERMANY, ASSIGNORS TO I. G. FARBENINDUSTRIE AKTIENGESELLSCHAFT, A CORPORATION OF GERMANY.

PROCESS FOR THE PRODUCTION OF NEW N-ALKYLCARBAZOLPHOSPHINOUS ACIDS.

No Drawing. Application filed October 1, 1925, Serial No. 59,961, and in Germany October 7, 1924.

We have found that by the action of phosphorus trichloride on N-alkylcarbazoles, inclusive of the benzyl compounds, and subsequent treatment with alkalies new compounds are formed which possess valuable therapeutic properties. They exercise an antirhachitic as well as a generally stimulating action on the weakened organism.

In contradistinction to the other aromatic phosphorus compounds already applied in therapeutics, as for instance those mentioned in Letters Patent No. 1,607,113, granted November 16, 1926, they are practically resistant to acids. Even by heating for 24 hours on the water bath with five normal hydrochloric acid they are not decomposed, whereas the phosphorus compounds mentioned in the above patent are affected by standing in cold one-tenth normal hydrochloric acid. The new compounds may on this account be administered by the mouth without being decomposed by the acidity of the stomach. This facilitates and cheapens their application in a high degree and marks an important progress in comparison with the phosphorus derivatives of Patent No. 1,607,113, in which the production of p-dialkylaminoarylphosphinous acids is described, by heating tertiary aromatic bases which are not substituted in the para position, such as dimethylaniline, dimethylmetatoluidine, diethylmetatoluidine etc. with phosphorus trichloride. The alkali metal salts of these p-dialkylaminophenylphosphinous acids are colorless and generally well crystallized, they dissolve readily in water, sparingly in alcohol, and are easily decomposed when treated with mineral acids. The new compounds have the composition of the alkylphosphinous acids and are formed according to the equation of reaction:

$$R.C_{12}H_8N + PCl_3 = R.C_{12}H_7N.PCl_2 + HCl$$
$$R.C_{12}H_7N.PCl_2 + 2H_2O = RC_{12}H_7N.P(OH)_2 + 2HCl$$
$$R.C_{12}H_7N.PCl_2 + 3NaOH = RC_{12}H_7N.P(OH)(ONa) + H_2O + 2NaCl$$

R signifying an alkyl.

The new compounds, for instance the methyl-, ethyl- and benzyl-carbazolphosphinous acids are nearly colorless compounds insoluble in water, which dissolve readily in alcohol and aceton and also in alkalies and alkali-metal carbonates, but are practically insoluble in other organic solvents. Their alkali metal salts dissolve readily in water; from which they are easily separated by the addition of salt, of an excess of caustic soda solution or of soda.

Example 1.

Methylcarbazolphosphinous acid

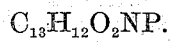

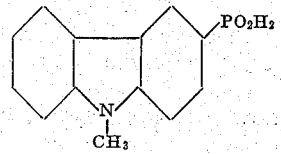

150 gr. methylcarbazol are melted and heated to 150° C. To this molten mass 100 gr. phosphorus trichloride are very gradually added in drops, a vessel provided with a reflux condenser being employed for the purpose. After the development of hydrochloric acid has ceased the mass is allowed to cool down and poured on a mixture of 450 ccm. caustic soda solution 38° Bé., 400 gr. water and 800 gr. ice. This mixture is allowed to stand for a while and then shaken up several times with ether. The remaining aqueous solution is evaporated to 500 ccm. and acidified with hydrochloric acid. The precipitated product is dissolved again in dilute caustic soda solution. From this solution, after shaking up several times with ether, a precipitate is obtained by means of hydrochloric acid. The precipitate is filtered off, washed with water, and dried. The new acid is practically insoluble in water, dilute mineral acids, ether, benzene, dissolves however readily in dilute alkalies, alkali metal carbonates methyl alcohol, ethyl alcohol and aceton.

Example 2.

Ethylcarbazolphosphinous acid $C_{14}H_{14}O_2NP$

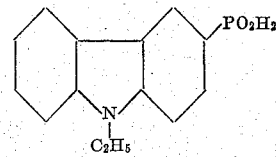

300 gr. ethylcarbazol are heated to 170° C. in a vessel provided with an agitator and a reflux condenser, the vessel being placed in an oil bath. 180 gr. phosphorus trichloride are then gradually added in drops, heating for another 36 hours to 170° C. (temperature of the oil bath). While still warm the viscid mass is stirred into a mixture of 2 liters ice-water and 400 ccm. caustic soda solution 38° Bé. When perfectly cold the mixture is filtered, the filtrate freed from the last traces of unchanged starting material by shaking with ether, and after filtering again percipitated with hydrochloric acid. The compound thus obtained forms a white powder, easily soluble in dilute alkalies and alkali metal carbonates, but is precipitated again by an excess of these materials, it is insoluble in dilute mineral acids, dissolves in hot alcohol and methanol with a faint violet fluorescence, in aceton and glacial acetic acid without fluorescence. In benzene it dissolves slightly on heating and also a trace in ether.

The alkali metal salts dissolve readily in water, but are precipitated by an excess of alkali.

Having now particularly described and ascertained the nature of our said invention and in what manner the same is to be performed, we declare, that what we claim is:—

1. Process for the production of N-alkyl-carbazolphosphinous acids by heating N-alkylcarbazoles with phosphorus trichloride and treating the compounds thus obtained with alkalies.

2. Process for the production of N-ethyl-carbazolphosphinous acid by heating N-ethylcarbazol with phosphorus trichloride and treating the compound thus obtained with alkalies.

3. As new substances N-alkylcarbazol-phosphinous acids, being white powders, practically insoluble in water and diluted acids, readily soluble in alkalies.

4. As a new substance N-ethylcarbazol-phosphinous acid, being a white powder, practically insoluble in water and dilute acids, and readily soluble in alkalies.

In witness whereof we have hereunto signed our names this 18th day of September, 1925.

ARTHUR von WEINBERG.
WERNER SCHMIDT.